May 14, 1929.  C. J. GORMAN  1,713,122

FISHHOOK

Filed May 11, 1928

Inventor
C. J. Gorman
By
Attorneys

Patented May 14, 1929.

1,713,122

UNITED STATES PATENT OFFICE.

CHESTER J. GORMAN, OF WEST BEND, WISCONSIN.

FISHHOOK.

Application filed May 11, 1928. Serial No. 277,063.

This invention relates to fish hooks.

Objects of this invention are to provide a novel form of fish hook which is so constructed that it is a weedless hook and will readily ride over weeds or other obstructions without any possible chance of entangling the hook.

Further objects are to provide a very simple type of resilient guard for the hook which is constructed of resilient wire and is carried by the shank and extends outwardly therefrom, preferably passing through the eyelet and provided with a pair of curved loops at the ends of the arms located on opposite sides of the hook so as to provide a slanting closed construction which will freely ride over any obstruction, but which readily permits deflection of the guard by the fish to remove it from proximity to the hook so that it will not interfere with the free action of the hook.

Further objects are to provide a construction which may be very simply and cheaply produced and which is highly practical in operation.

An embodiment of the invention is shown in the accompanying drawings in which.

Figure 1:
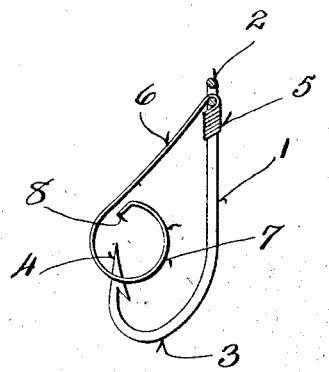
Figure 1 is an elevation with the eyelet in section.
Figure 2:
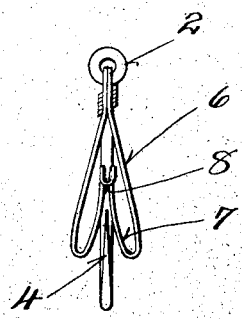
Figure 2 is a front view of the structure shown in Figure 1.

Referring to the drawings, it will be seen that the hook comprises a shank 1 provided with an eyelet 2 at one end and with a curved portion 3 terminating in a hook 4 at its other end.

The resilient guard consists of a resilient wire having a portion 5 wound around the shank and having a pair of arms 6 projecting through the eyelet and extending downwardly towards the hook. These arms are each provided at their free ends with coils or looped portions 7 located on opposite sides of the hook and joined by a transverse portion 8 above the hook.

It will be seen that a very simple type of guard has been provided by this invention, which is easy to produce, which is highly effective in operation, and which does not interfere with the free action of the hook in its intended capacity.

Although the invention has been described in considerable detail, such description is intended as illustrative rather than limiting as the invention may be variously embodied and as the scope of such invention is to be determined as claimed.

I claim:

A fish hook comprising a shank having an eyelet at one end and a curved portion terminating in a hook at its other end, a resilient guard consisting of a wire wrapped around said shank and having a pair of arms extending through said eyelet and towards said hook, each of said arms having a coil formed at its outer end, said coils being located on opposite sides of said hook and being joined above said hook.

In testimony that I claim the foregoing I have hereunto set my hand at Milwaukee, in the county of Milwaukee and State of Wisconsin.

CHESTER J. GORMAN.